J. W. SYLER.
FRUIT GRADER.
APPLICATION FILED SEPT. 7, 1912.

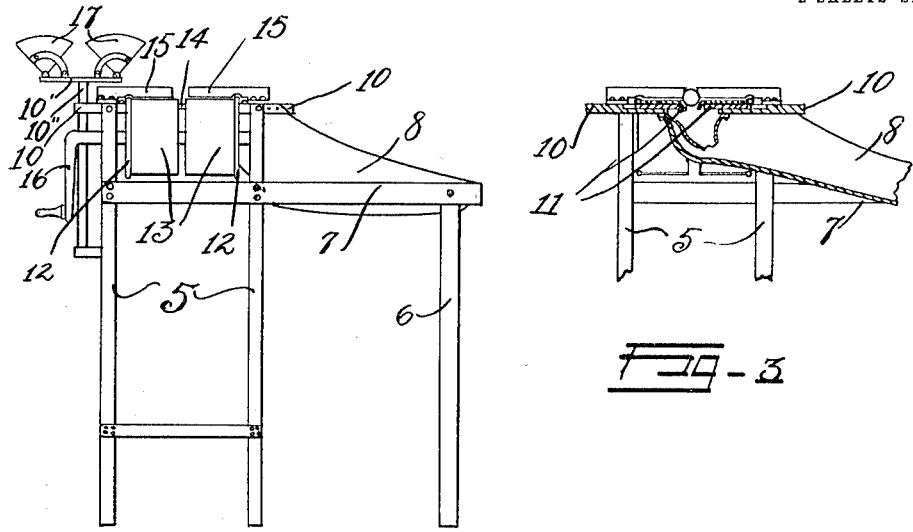
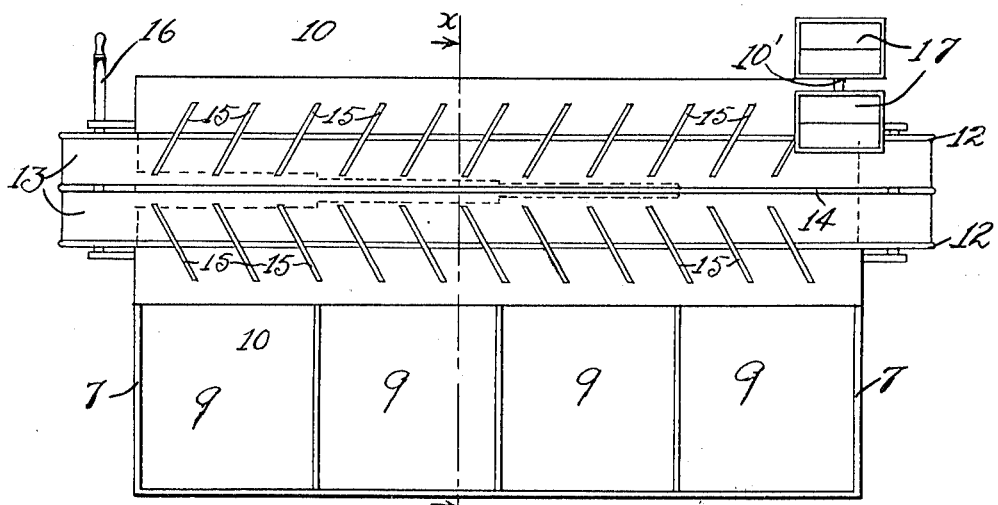

1,072,192.

Patented Sept. 2, 1913.

2 SHEETS—SHEET 2.

Witnesses
Murray C. Taylor.
L. Jordon

Inventor
John Wesley Syler.
By Clayton S. Dow
Attorney ated Sept. 2, 1913.

UNITED STATES PATENT OFFICE.

JOHN WESLEY SYLER, OF HILLYARD, WASHINGTON.

FRUIT-GRADER.

1,072,192. Specification of Letters Patent. Patented Sept. 2, 1913.

Application filed September 7, 1912. Serial No. 719,106.

*To all whom it may concern:*

Be it known that I, JOHN WESLEY SYLER, a citizen of the United States, residing at Hillyard, in the county of Spokane and State of Washington, have invented certain new and useful Improvements in Fruit-Graders, of which the following is a specification.

This invention relates to a grader, or more particularly to what is commonly known as a fruit grader.

The object of this invention is to provide a grader which will grade various kinds of fruit without injuring it in any way.

It is also an object to so construct the machine that one person can feed the fruit to the grader and operate the same, thereby doing away with the necessity of two hands.

Another object is to make a grader which can be folded and packed away in a very small place when not in use.

Further objects and advantages of this invention will be disclosed in the detailed description which now follows.

Figure 4:
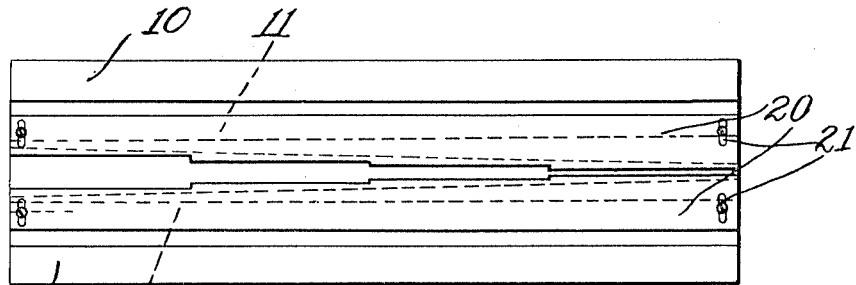
Figure 5:
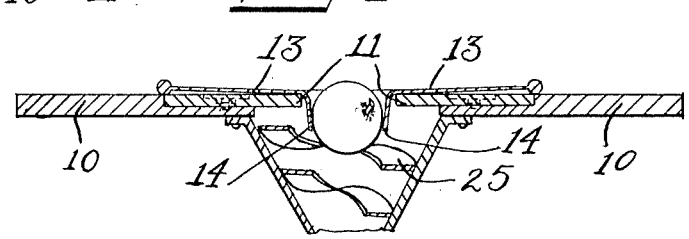
Figure 6:
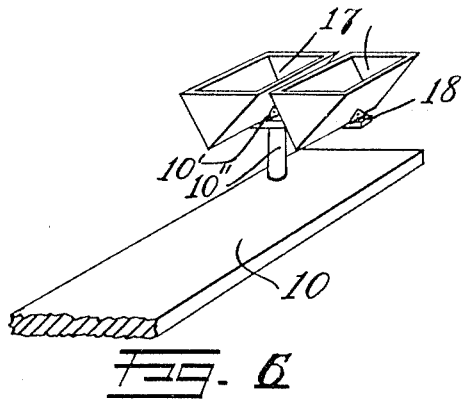

Figure 1 is an end view of a fruit grader constructed in accordance with my invention, Fig. 2 is a plan view, Fig. 3 is a cross section on the line x—x, Fig. 4 is a detail of the grading plates, Fig. 5 is a detail of the means for preventing bruising, Fig. 6 is a detailed view of the supply box and its fastening means.

Referring to the drawings like numerals designate corresponding parts of the various views.

The numeral 5 designates the frame of the machine which has folding legs 6, and a folding frame 7, which carries a canvas top 8. This canvas top is formed into pockets 9, into which the various sizes of fruit fall and are retained. The frame 5 carries a top 10, which is divided as at 11, throughout its length. Carried beneath both ends of this top 10, are grooved pulleys 12, which carry a divided canvas conveyer 13. This conveyer consists of a canvas strip having flexible cords or belts of some kind sewed in its outer edge. This conveyer is cut through the middle as at 14, so as to allow the fruit which it carries, to drop through when passing over the grader plates. Carried upon this top 10, are rubbers 15, which guide the fruit to the center so that it will be properly graded. This conveyer is moved by rotating the handle 16, or by a ratchet and foot pedal (not shown) or by power if the same is available. If foot power or motor power is used it will leave the hands free to place the fruit upon the grader. Two boxes or hoppers 17, are provided and hinged to a member 10', as at 18. These boxes are so hinged that they may be tilted and held in this tilted position by any desirable means. The member 10 is rigidly attached to a member 10" which is rotated and mounted upon the frame of the grader.

Beneath the conveyer 13, upon both sides of the top are arranged grader plates 20, which are provided with elongated slots 21, so that the plates can be moved toward or away from each other to accommodate various sizes of fruit.

The operation of my device is as follows:—The fruit to be graded is placed in the boxes 17, the grader plates may be made as shown in full lines of Fig. 4 or as shown in dotted lines. After the fruit passes through the conveyer as shown in Fig. 5 it will pass down to the canvas table top being dropped thereon or its motion may be retarded by causing the fruit to take a spiral path along a guide way 25, this will insure the fruit reaching its proper compartment without being injured. The hopper is filled and the same is adjusted at any angle which is most convenient for the operator. When one box is empty the member 10' can be rotated and the same will bring the second box or hopper into position. Power is then applied so as to rotate the divided canvas conveyer over the divided top 10. As the fruit falls from the hopper on to the conveyer and is moved forward it comes into contact with the rubbers 15, which bring the fruit directly over the division in the conveyer. Passing forward the fruit comes over the grader plates until it comes to the portion which is large enough to allow it to pass through as shown in Fig. 5, it then drops on the canvas 8 either directly or by following the spiral 25, and lays there until gathered.

It will be understood that certain changes may be made in the various details of construction without departing from the scope of the appended claims.

Having described my invention what I claim is:—

1. In a fruit grader, a support, adjustable grader plates on said support and a divided longitudinally movable conveyer movable over the plates.

2. In a grader the combination with a stand, a divided top carried by said stand, pulleys mounted beneath said divided top and at each end thereof, a conveyer carried by said pulley, said conveyer passing over said divided top and adapted to carry fruit thereon, said conveyer being divided centrally throughout its length, said division overlying the division in the divided top, means carried by the divided top for causing the fruit to take a central position upon the conveyer.

3. In a grader the combination with a stand, a divided top carried by said stand, pulleys mounted beneath said divided top and at each end thereof, a conveyer carried by said pulley, said conveyer passing over said divided top and adapted to carry fruit thereon, said conveyer being divided centrally throughout its length, said division overlying the division in the divided top, means carried by the divided top for causing the fruit to take a central position upon the conveyer, means located beneath said conveyer and upon said top for grading the fruit, said means consisting of two plates capable of movement to and from each other.

4. In a grader the combination with a stand, a frame, a flexible top carried by said frame, a divided top carried by said stand, pulleys mounted beneath said divided top and at each end thereof, said pulleys having one edge of their periphery grooved, a conveyer carried by said pulley, said conveyer passing over said divided top and adapted to carry fruit thereon, said conveyer being divided centrally throughout its length, said division overlying the division in the divided top, means carried by the divided top for causing the fruit to take a central position upon the conveyer, and means located beneath said conveyer and upon said top for grading the fruit, said means consisting of two plates capable of movement to and from each other.

5. A fruit grader comprising a support having graded openings, and a pair of bodily flexible parallel conveyers movable over the support with their adjacent edge portions disposed over the openings.

6. A fruit grader comprising a support having graded openings, and a conveyer movable over the openings and having longitudinal portions adapted to bend under the weight of fruit to permit the same to drop into the openings.

In testimony whereof I affix my signature in presence of two witnesses.

JOHN WESLEY SYLER.

Witnesses:
G. L. CHAMBERLIN,
D. L. CHAMBERLIN.

Copies of this patent may be obtained for five cents each, by addressing the "Commissioner of Patents, Washington, D. C."